Patented Mar. 21, 1950

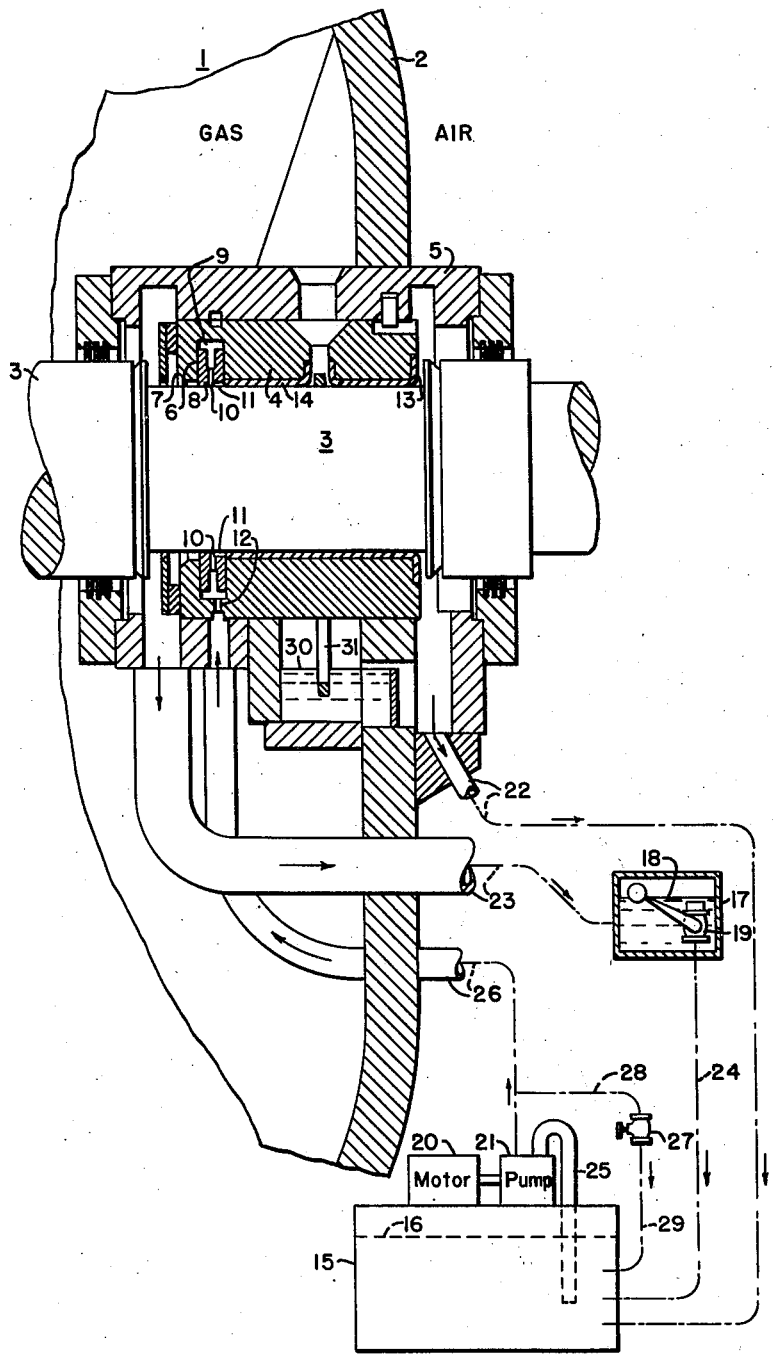

2,501,304

UNITED STATES PATENT OFFICE 2,501,304

GLAND-SEAL BEARING FOR GAS-COOLED EQUIPMENT

René A. Baudry and Bernard B. Winer, Pittsburgh, Pa., assignors to Westinghouse Electric Corporation, East Pittsburgh, Pa., a corporation of Pennsylvania Application November 30, 1948, Serial No. 62,762

8 Claims. (Cl. 308—36.3)

Our invention relates to a simple but effective gland-seal bearing for gas-cooled equipment, such as a nitrogen-cooled alternating-current motor, in which nitrogen is used as an inert gas for rendering the motor explosion-proof, or a hydrogen-cooled synchronous condenser or generator, in which hydrogen is used as a light gas for reducing windage-losses and for increasing the performance-rating.

An object of our invention is to provide a simple, compact construction which may be installed in a standard bearing, with minor modifications.

A further object of our invention is to provide a gland-seal bearing in which the same oil is used to cool and lubricate the bearing and to provide the seal between the gas within the housing of the machine and the atmosphere surrounding the housing, the rate of oil-flow to the gas-side of the bearing being only about one-tenth of the rate of oil-flow to the air-side of the bearing, so that a very small amount of contaminating gas is brought into the interior of the housing by the gas-side oil, thus avoiding the necessity for elaborate oil-treatment apparatus for removing the gases therefrom.

With the foregoing and other objects in view, our invention consists in the novel structural features, combinations, parts, and methods of design and use, hereinafter described and claimed, and illustrated in the accompanying drawing, the single figure of which is a longitudinal cross-sectional view of a portion of a machine showing a gland-seal bearing-construction in accordance with our invention, with a diagrammatically represented addition of the external parts of the oil-circulation system.

As shown in the drawing, our invention is used in connection with a gas-cooled machine 1, comprising a housing 2 which is filled with a gas other than the surrounding atmosphere. Such a gas could be either nitrogen or hydrogen, as has already been intimated. The machine has a rotor-member having a shaft 3 which extends through the housing 2, and which is supported by a journal-bearing 4 which surrounds the shaft at the place where the shaft extends through the housing 2. The bearing 4 is supported in a bearing-housing 5 which is carried by the machine-housing 2.

In accordance with our invention, the bearing 4 is provided with an annular groove 6 near the gas-side 7 thereof, and a self-centering sealing-ring 8 is located within said annular groove 6 so that it is free to center itself on the shaft 3. The sealing-ring 8 has a smaller outer diameter than the annular groove 6, thus providing an annular space 9 within the annular groove 6 outside of the sealing-ring 8. The sealing-ring 8 has a plurality of holes 10 extending therethrough from its outer periphery to its inner periphery, the inner periphery of the sealing-ring being of a larger diameter on the air-side of said holes 10, than on the gas-side thereof, so as to provide an inner annular groove 11 surrounding the shaft 3, with the holes 10 providing a communication-means for the flow of oil from the outer annular chamber 9 to the inner annular groove 11.

In its broadest aspect, the self-centering sealing-ring 8 constitutes an oil-feeding portion, for feeding oil to the bearing at a point near the gas-end 7 thereof. Oil is supplied to the annular space 9 through an oil-supply opening 12 in the bearing.

It is an essential feature of our invention that the construction shall be such as to provide a much higher rate of flow of oil from the inner annular groove 11 to the air-side 13 of the bearing than to the gas-side 7 of the bearing, so that almost all of the oil flows from said inner annular groove 11 to the air-side 13 of the bearing to cool and lubricate the bearing, while only a relatively small amount of oil flows from the annular groove 11 to the gas-side 7 of the bearing to complete the seal between the gas within the housing 2 and the atmosphere surrounding said housing. Any structural means which brings about this result could be used, in conformity with the broader aspects of our invention.

We prefer, however, to use a self-centering sealing-ring 8 which fits the shaft 3 with a closer tolerance or smaller clearance, than is possible or desirable for the shaft-engaging bearing-surface of the bearing proper. In other words, the diameter of the inner periphery of the sealing-ring 8, on the gas-side of the holes 10, is only slightly larger than the diameter of the corresponding portion of the shaft 3, whereas the diameter of the inner periphery of the sealing-ring, on the air-side of the holes 10, is somewhat larger, so as to provide the inner annular groove 11.

On the other hand, the bearing-lining 14 of the bearing, which comes in contact with the shaft 3, has an inner diameter which is intermediate between the inner diameters of the two portions of the sealing-ring 8, that is, the two portions on opposite sides of the row of radial holes 10 in said sealing-ring. The bearing-lining 14 may also be provided with radially or spirally extending oil-distributing grooves (not shown) in accordance with a known bearing-practice. At any rate, the construction is such that the oil which is supplied through the radial holes 10 flows much more freely between the bearing-lining 14 and the shaft 3, so as to flow to the air-side 13 of the bearing, than between the close-fitting gas-side of the sealing-ring 8 and the shaft 3, so as to flow to the gas-side 7 of the bearing.

In our preferred construction, as illustrated, the bearing-lining 14 is not used on the small portion of the bearing between the sealing-ring groove 6 and the gas-side 7 of the bearing, so as to avoid heating and lubrication difficulties due to the slow rate of axial oil-flow at this end of the bearing, although our invention is probably not necessarily limited to this particular feature.

Our combined seal and bearing also requires the use of certain equipment outside of the machine-housing 2, including an oil-tank 15 containing oil having atmosphere over its top-surface 16, and oil-trap 17 having oil 18 which is maintained at an approximately constant level, as by means of a float-valve 19, an oil-pumping means, comprising a motor 20 driving a pump 21, for recirculating the oil, and piping-means, including a drain-connection 22 from the air-side of the bearing to the oil-tank 15, a drain-connection 23 from the gas-side of the bearing to the oil-trap 17, a drain-connection 24 from said oil-trap to the oil-tank 15, an oil-supply connection 25 from the oil-tank 15 to the oil-pump 21, and another oil-supply connection 26 from the pump 21 to the annular space 9 surrounding the sealing-ring 8, the last-mentioned oil-supply connection merging into, or communicating with, the oil-supply hole 12 which communicates with the annular space 9. In order to cause the pump 21 to maintain a predetermined oil-pressure of the desired magnitude, a pressure-controlling means is provided, such as a bypass-valve or orifice 27 which is connected by suitable piping 28 and 29 between the pump-outlet 26 and the oil-tank 15, in accordance with a common practice in connection with oil-pumps.

We also preferably provide a bearing-construction which provides an auxiliary pocket of oil 30 underneath an intermediate portion of the bearing on the air-side of the oil-feeding portion or sealing-ring 8, and we provide an oil-ring 31 which rides on the shaft and dips into this auxiliary pocket of oil 30 for the purpose of providing an emergency supply of lubricating and sealing oil, in the event of a pump-failure.

The operation of our invention will be obvious from the drawing and from the preceding description. When the gas-pressure within the machine-housing 2 is of the order of ½ pound per square inch (p. s. i.), it would be suitable to have the oil flow axially through the bearing at the rate of about one gallon per minute (g. p. m.) from the radial holes 10 to the air-side 13 of the bearing, and at the rate of about one-tenth g. p. m. from the holes 10 to the gas-side 7. The one-g. p. m. flow will be sufficiently fast to cool and lubricate the bearing of a machine which is not too large in size and which does not operate at too high a speed, while the slow oil-flow of one-tenth g. p. m. will be so slow that the amount of contaminating gases which are brought into the interior of the housing 2, with this small quantity of gas-side oil, is very small, and likewise the amount of gas which is absorbed by this small amount of gas-side oil, and carried out of the machine through the drain-pipes 23 and 24 would also be very small. Even when the gas within the machine-housing 2 is hydrogen, which is the hardest gas to hold within a container, because of its small molecular size, the gas-consumption with our apparatus is limited to 10 cubic feet per day, or less. This is done without requiring a vacuum system or any equivalent means for purifying the recirculated oil. When the cooling-gas within the machine-housing 2 is nitrogen, or some other gas having a higher molecular weight than hydrogen, the rate of gas-leakage is even less. These specific figures are only exemplary.

We claim as our invention:

1. A gas-cooled machine comprising a housing filled with a gas other than the surrounding atmosphere, a rotor-member having a shaft extending through said housing, a journal-bearing surrounding the shaft where it extends through the housing, said bearing having an oil-feeding portion near the gas-side thereof, said oil-feeding portion comprising an outer annular space, means for supplying oil to said outer annular space, said oil-feeding portion further having an inner peripheral portion of increased diameter which provides an inner annular groove surrounding the shaft, and a plurality of holes extending from said outer annular space into communication with said inner annular groove, the construction being such as to provide a much higher rate of flow of oil from said inner annular groove to the air-side of the bearing than to the gas-side of the bearing, whereby almost all of the oil flows from said inner annular groove to the air-side of the bearing to cool and lubricate the bearing, while only a relatively small amount of oil flows from the annular groove to the gas-side of the bearing to complete the seal between the gas within the housing and the atmosphere surrounding the housing, an oil-tank containing oil having atmosphere over its top-surface, an oil-trap having oil which is maintained at an approximately constant level, oil-pumping means for recirculating the oil, and piping-means including a drain-connection from the air-side of the bearing to the oil-tank, a drain-connection from the gas-side of the bearing to said oil-trap, a drain-connection from said oil-trap to the oil-tank, and an oil-supply connection from said oil-tank to said oil-pump and thence to the outer annular space of the oil-feeding portion of the bearing to constitute the oil-supplying means therefor.

2. The invention as defined in claim 1, in combination with means for providing an auxiliary pocket of oil underneath an intermediate portion of the bearing on the air-side of said oil-feeding portion, and an oil-ring riding on the shaft and dipping into said auxiliary pocket of oil for providing emergency supply of lubricating and sealing oil in the event of a pump-failure.

3. A gas-cooled machine comprising a housing filled with a gas other than the surrounding atmosphere, a rotor-member having a shaft extending through said housing, a journal-bearing surrounding the shaft where it extends through the housing, said bearing having an annular groove therein near the gas-side thereof, a self-centering sealing-ring located within said annular groove so that it is free to center itself on the shaft, means for supplying oil to an annular space within said annular groove outside of said sealing-ring, said sealing-ring having an inner peripheral portion of increased diameter which provides an inner annular groove surrounding the shaft, said sealing-ring having a plurality of holes extending therethrough from its outer periphery into communication with said inner annular groove, the construction being such as to provide a much higher rate of flow of oil from said inner annular groove to the air-side of the bearing than to the gas-side of the bearing, whereby almost all of the oil flows from said inner annular groove to the air-side of the bearing to cool and lubricate the bearing, while only a relatively small amount of oil flows from the annular groove to the gas-side of the bearing to complete the seal between the gas within the housing and the atmosphere surrounding the housing, an oil-tank containing oil having atmosphere over its top-surface, an oil-trap having oil which is maintained at an approximately constant level, oil-pumping means for recirculating the oil, and piping-means including a drain-connection from the air-side of the bearing to the oil-tank, a drain-connection from the gas-side of the bearing to said oil-trap, a drain-connection from said oil-trap to the oil-tank, and an oil-supply connection from said oil-tank to said oil-pump and thence to the annular space surrounding said sealing-ring to constitute the oil-supplying means therefor.

4. The invention as defined in claim 3, in combination with means for providing an auxiliary pocket of oil underneath an intermediate portion of the bearing on the air-side of said sealing-ring, and an oil-ring riding on the shaft and dipping into said auxiliary pocket of oil for providing emergency supply of lubricating and sealing oil in the event of a pump-failure.

5. A gas-cooled machine comprising a housing filled with a gas other than the surrounding atmosphere, a rotor-member having a shaft extending through said housing, a journal-bearing surrounding the shaft where it extends through the housing, said bearing having an annular groove therein near the gas-side thereof, a self-centering sealing-ring located within said annular groove so that it is free to center itself on the shaft, means for supplying oil to an annular space within said annular groove outside of said sealing-ring, said sealing-ring having a plurality of holes extending therethrough from its outer periphery to its inner periphery, the inner periphery of said sealing-ring being of a larger diameter on the air-side of said holes than on the gas-side thereof, whereby almost all of the oil flows through the air-side under the sealing-ring to cool and lubricate the bearing, while only a relatively small amount of oil flows through the gas-side under the sealing-ring to complete the seal between the gas within the housing and the atmosphere surrounding the housing, an oil-tank containing oil having atmosphere over its top-surface, an oil-trap having oil which is maintained at an approximately constant level, oil-pumping means for recirculating the oil, and piping-means including a drain-connection from the air-side of the bearing to the oil-tank, a drain-connection from the gas-side of the bearing to said oil-trap, a drain-connection from said oil-trap to the oil-tank, and an oil-supply connection from said oil-tank to said oil-pump and thence to the annular space surrounding said sealing-ring to constitute the oil-supplying means therefor.

6. The invention as defined in claim 5, in combination with means for providing an auxiliary pocket of oil underneath an intermediate portion of the bearing on the air-side of said sealing-ring, and an oil-ring riding on the shaft and dipping into said auxiliary pocket of oil for providing emergency supply of lubricating and sealing oil in the event of a pump-failure.

7. The invention as defined in claim 5, characterized by the bearing having a bearing-lining which contacts the shaft on only the air-side of said sealing-ring.

8. The invention as defined in claim 7, in combination with means for providing an auxiliary pocket of oil underneath an intermediate portion of the bearing on the air-side of said sealing-ring, and an oil-ring riding on the shaft and dipping into said auxiliary pocket of oil for providing emergency supply of lubricating and sealing oil in the event of a pump-failure.

RENÉ A. BAUDRY.
BERNARD B. WINER.

REFERENCES CITED

The following references are of record in the file of this patent:

UNITED STATES PATENTS

| Number | Name | Date |
|---|---|---|
| 1,840,127 | Penney | Jan. 5, 1932 |
| 2,159,057 | Sterrett | May 23, 1939 |
| 2,253,350 | Ross | Aug. 19, 1941 |